United States Patent

[11] 3,593,706

[72] Inventor: Herbert Schubert
 7134 Knittlingen, Schillerstrasse 31, Germany
[21] Appl. No. 793,992
[22] Filed Jan. 27, 1969
[45] Patented July 20, 1971
[32] Priority Feb. 20, 1968
[33] Germany
[31] W 41 688

[54] FLEXIBLE OR PARTLY FLEXIBLE GASTROSCOPE
 7 Claims, 4 Drawing Figs.

[52] U.S. Cl. .................................................. 128/8
[51] Int. Cl. .................................................. A61b 1/06
[50] Field of Search .................................... 128/6, 7, 8

[56] References Cited
UNITED STATES PATENTS
2,867,209  1/1959  Foures et al. .................. 128/6
2,936,753  5/1960  Storz ............................. 128/6
2,975,785  3/1961  Sheldon ........................ 128/6

FOREIGN PATENTS
1,511,373  12/1967  France .......................... 128/6

Primary Examiner—Channing L. Pace
Attorney—Karl F. Ross

ABSTRACT: A flexible gastroscope with a fiber-optical image conductor has a cylindrical distal head formed with a lateral viewing port next to an objective working into the image conductor, an adjoining lateral exit aperture for surgical implements, and a lateral illumination window just beyond that aperture. The illumination window leads into a chamber which contains two axially extending, laterally juxtaposed light sources, i.e. a U-shaped flash tube alongside the window and a lamp positioned to radiate through the flash tube and the window in series.

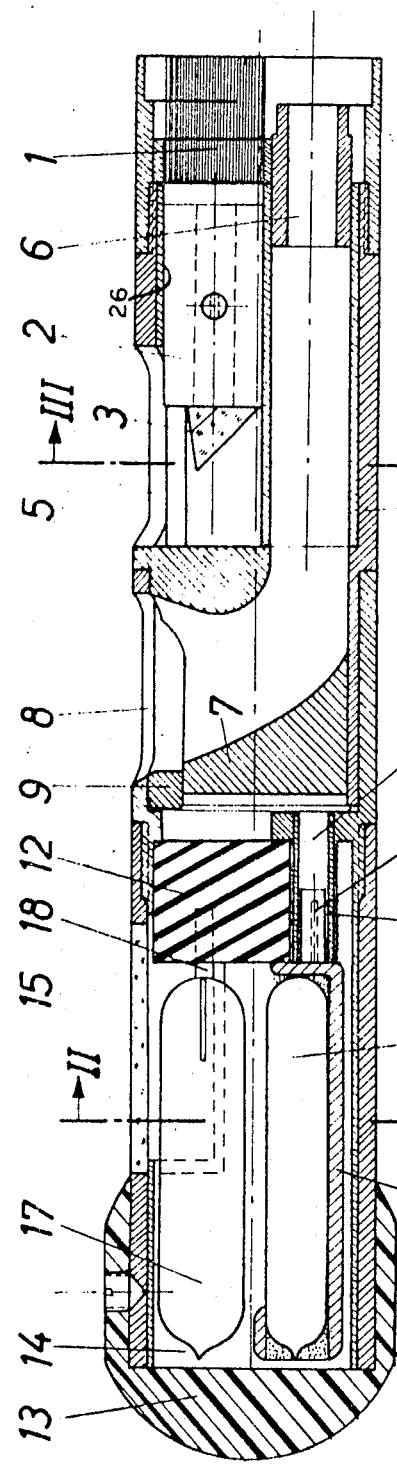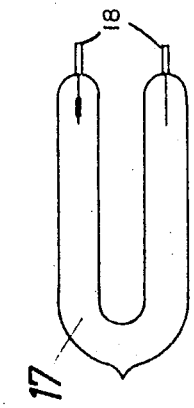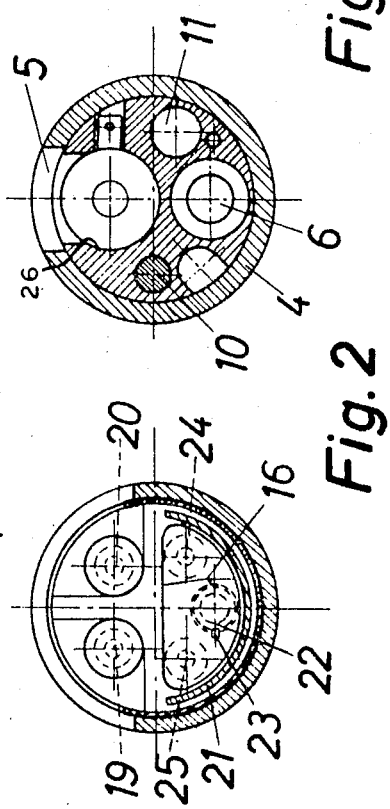
Herbert Schubert
Inventor.
By Karl F. Ross
Attorney

FLEXIBLE OR PARTLY FLEXIBLE GASTROSCOPE

The invention relates to a flexible or partly flexible gastroscope including a fiber-optical image conductor and an objective in front of a lateral viewing port juxtaposed with an aperture serving for the controlled outward extension of surgical implements such as probes and tongs, passing through the gastroscope, while a distal head member carries a lamp for illuminating the field of view through a window.

In order to obtain flexibility of gastroscopes over all or part of their length, it is known to extend a fiber-optical image conductor for observation and a fiber-optical light conductor for illuminating the field of view through the flexible casing while letting the light beam of an incandescent lamp impinge upon the forward or proximal end of the light conductor. For taking photographic pictures, this incandescent lamp had to be energized with greater voltage in order to obtain an increased illumination. Alternatively the increased light emission could be realized by triggering a proximally arranged electronic flash tube, whereby it was possible to take photographic pictures after the observation.

However, neither of these known types of illumination, utilizing proximal light sources and fiber light conductors, is satisfactory for photography, particularly for the taking of colored or moving pictures, since the fiber-optical light conductor must consist of a large number of light-conducting fibers for adequate lighting whereby the diameter of the gastroscope is increased and the flexibility decreased to such an extent that, upon sharper bending, there is a danger of breaking the light-conducting fibers.

Practice has shown that the known distal or rearward arrangement of an observation lamp and an electronic flash tube will lead to the most favorable illuminating conditions when taking photographic pictures whereby the fiber-optical light conductor extending through the gastroscope may be omitted so that merely the fiber-optical image conductor remains thereby avoiding an increase of the gastroscope diameter. In this connection, however, it was hitherto necessary to use flash tubes which fully occupied the inner cross-sectional area of the distal head so that the observation lamp and the flash tube had to be longitudinally spaced one behind the other beyond the viewing part and the adjoining lateral aperture for the insertion of probes, tongs or the like (German published Pat. application No. 1,047,375). According to this arrangement the flash tube was spaced a relatively great distance from the viewing port, resulting in less favorable illumination.

Lately it has become possible to produce electronic flash tubes of greatly reduced dimensions for a given light intensity. In accordance with the invention, I propose to arrange such a flash tube within a distal head of the above-mentioned gastroscope in laterally juxtaposed relationship with an observation lamp just beyond the exit aperture for the surgical implements or, if such an exit aperture is absent, directly beyond the viewing port, the observation lamp radiating its light through the flash tube and an adjoining illumination window. Thus it is possible to arrange both the observation lamp and the electronic flash tube in the immediate vicinity of the outlet for the probes, tongs or the like, next to each other, so that the illumination is suitable for observation as well as for taking photographs inasmuch as the light will radiate from the instrument at a location close to the field of view.

One embodiment of the invention shown by way of example in the accompanying drawing will now be described. In the drawings:

FIG. 1 is an axial sectional view through the distal end of a gastroscope according to the invention;

FIG. 2 is a cross-sectional view taken along the line II–II in FIG. 1 looking in a direction of the arrows including an electronic flash tube;

FIG. 3 is a cross-sectional view along the line III–III in FIG. 1 looking in the direction of the arrows; and FIG. 4 is a plan view of the electronic flash tube on a smaller scale.

According to the embodiment shown in FIGS. 1 to 3, a fiber-optical image conductor 1 extends through the flexible casing of the gastroscope from a proximal ocular or eyepiece, with or without a photographic or a film camera attached thereto distally, subsequent to which an objective 2 with a deflecting prism 3 is provided. The objective 2 may, for example, be shiftable in longitudinal direction within a passage 26 to allow sharp focusing. A lateral viewing port 5 is disposed in front of the deflecting prism 3 in a rigid distal head 4 of cylindrical shape through which the observation of the cavity of the body is possible. A passage 6 extends through the gastroscope, terminating at the proximal or forward end in a lateral opening for the insertion of probes, tongs or the like which may be guided laterally out of the endoscope by a guide member 7 and an exit aperture 8 of the head 4. The distal end of these probes may be deflected, for example by providing a slide 9 shiftable by a Bowden cable 10. The slide 9 may be connected to the Bowden cable by a lateral projection which may be moved forwardly against the force of a pressure spring (not shown). Another passage 11 extending through the gastroscope merges rearwardly with the passage 6. Air or gas may be introduced into the cavity of the body through this passage 11. An insulating member 12 is arranged within the head 4 distally beyond the guide 7 and the slide 9. The insulating member 12 and a spherical cap 13 of plastic material define a chamber 14 serving to accommodate the illuminating means, this chamber being provided with a window 15 aligned with the exit aperture 8 and the observation window 5.

According to the invention, an observation lamp 16 and an electronic flash tube 17 are arranged within the head chamber 14 in laterally adjoining relationship in such a manner that the observation lamp 16 radiates its light through the flash tube 17 and the window 15 into the cavity of the body. The two terminals 18 of the electronic flash tube provided at the ends of the legs of this tube, plug into jackets 19 and 20 of the insulating member; conductors extending from these contact sleeves lead through the endoscope via the proximal gastroscope section to an electric energy source. The conventionally designed observation lamp 16 engages with its grounded terminal a base 21, located on the side remote from tube 17 and window 15, which in turn engages with a cylindrical extension 22 and a lateral key 22a in a bore 23 with an axially extending lateral groove for the key whereby the base 21 is secured against rotation. The other terminal of the observation lamp 16 plugs into a socket 24 arranged in the insulating member 12 and communicates via a conductor, extending through the gastroscope, with an electric energy source.

The electronic flash tube 17 is U-shaped, its free legs with their terminal plugs 18 being directed towards the insulating member 12, while the observation lamp 16 has a semicircular cross-sectional shape, as may be seen in FIG. 2, with a flat side facing the axially extending legs of tube 17.

The construction according to the invention allows the observation lamp 16 as well as the electronic flash tube 17 to be mounted as closely as possible to the observation window 5, whereby an especially favorable illumination of the body cavity is possible, both for direct viewing by means of the observation lamp and for taking photographic pictures by means of the electronic flash tube.

If the gastroscope is to be used for filming, the spherical cap 13 is removed and the two elongate lamps 16 and 17 are extracted from the illuminating chamber 14, to be replaced by a single lamp of circular cross-sectional shape filling the entire cross section of the chamber and of sufficient illuminating intensity for filming. The grounded terminal of this lamp again engages with a cylindrical extension in the axially extending bore 23 of the insulating member 12 while the line terminal plugs into an additional socket 25 of the insulating member 12 which is connected via an insulated conductor and a proximal terminal to an electric energy source.

It is also possible to insert, instead of a film lamp occupying the entire chamber 14, a lamp of smaller capacity developing less heat then the film lamp but furnishing a sufficient illumination for observation purposes.

What I claim:

1. An endoscopic instrument comprising a generally cylindrical elongate head having a chamber at one end, a lateral viewing port adjacent the other end and a lateral illumination window communicating with said chamber; image-conducting means terminating at said viewing port and extending therefrom axially to said other end; and a pair of laterally juxtaposed, elongate light sources extending axially within said chamber alongside said window, one of said light sources being positioned close to said window, the other of said light sources being disposed remote from said window for radiating through said one of said light sources and said window in series.

2. An instrument as defined in claim 1 wherein said one of said light sources is a generally U-shaped tube with legs extending axially of said head.

3. An instrument as defined in claim 2 wherein said other of said light sources is a tube of generally semicircular cross section having a flat side facing said legs.

4. An instrument as defined in claim 1 wherein said head is provided with a first axially extending passage for said image-conducting means and with a second axially extending passage for the insertion of a surgical implement, said second passage terminating in a lateral exit aperture between said port and said window.

5. An instrument as defined in claim 4 wherein said head includes an internal insulating member interposed between said passages and said chamber, said member forming sockets for said light sources included in an external energizing circuit therefor.

6. An instrument as defined in claim 5 wherein said other of said light sources is provided with a base on the side remote from said window, said base being nonrotatably plugged into one of said sockets and being conductively connected with the last-mentioned light source.

7. An instrument as defined in claim 1 wherein said one of said light sources is a flash tube.